US010681643B2

(12) United States Patent
Pu et al.

(10) Patent No.: US 10,681,643 B2
(45) Date of Patent: *Jun. 9, 2020

(54) OPPORTUNISTIC RX CHAIN DEPOWERING BASED ON ALLOCATED RANK AND MCS

(71) Applicant: Apple Inc., Cupertino, CA (US)

(72) Inventors: Tianyan Pu, Cupertino, CA (US); Sai Sravan Bharadwaj Karri, Santa Clara, CA (US); Wei Zhang, Santa Clara, CA (US); Swaminathan Balakrishnan, Santa Clara, CA (US); Xiantao Sun, Sunnyvale, CA (US); Beibei Wang, Cupertino, CA (US); Manish G. Vemulapalli, Milpitas, CA (US); Jia Tang, San Jose, CA (US); Sami M. Almalfouh, San Jose, CA (US); Zhu Ji, San Jose, CA (US); Sachin J. Sane, Santa Clara, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/442,730

(22) Filed: Jun. 17, 2019

(65) Prior Publication Data
US 2019/0306793 A1 Oct. 3, 2019

Related U.S. Application Data

(63) Continuation of application No. 16/119,801, filed on Aug. 31, 2018, now Pat. No. 10,341,956.

(60) Provisional application No. 62/575,945, filed on Oct. 23, 2017.

(51) Int. Cl.
H04W 52/02 (2009.01)
H04B 7/0456 (2017.01)
H04B 7/08 (2006.01)
H04W 88/06 (2009.01)

(52) U.S. Cl.
CPC ........ *H04W 52/028* (2013.01); *H04B 7/0456* (2013.01); *H04B 7/0877* (2013.01); *H04W 52/0206* (2013.01); *H04W 88/06* (2013.01)

(58) Field of Classification Search
CPC .. H04B 7/0566; H04B 17/309; H04B 1/0483; H04W 52/02; H04W 52/028; H04W 52/0274; H04W 28/06; H04W 26/08; H04W 52/0225

See application file for complete search history.

(56) References Cited

U.S. PATENT DOCUMENTS

| 8,891,703 | B2 | 11/2014 | HomChaudhuri |
| 9,591,574 | B2 | 3/2017 | Damji |
| 2003/0043732 | A1 | 3/2003 | Walton |
| 2009/0041159 | A1 | 2/2009 | Duvvuru |

(Continued)

*Primary Examiner* — Thanh C Le
(74) *Attorney, Agent, or Firm* — Kowert, Hood, Munyon, Rankin & Goetzel, P.C.

(57) ABSTRACT

This disclosure relates to techniques for opportunistically depowering receiver chains of a wireless device. Based on control information, a device may determine whether the current number of active receiver chains can be reduced while maintaining a target achievable code rate for a period of data reception associated with the control information. Additionally, the device may generate and use a lookup table to determine whether to depower receiver chains, and which receiver chains to depower.

20 Claims, 7 Drawing Sheets

(56) References Cited

U.S. PATENT DOCUMENTS

| | | | |
|---|---|---|---|
| 2015/0100801 A1* | 4/2015 | Maity | G06F 1/324 |
| | | | 713/320 |
| 2017/0324458 A1 | 11/2017 | Liu | |
| 2017/0359200 A1 | 12/2017 | Almalfouh | |
| 2018/0059769 A1 | 3/2018 | Sripathi | |
| 2018/0063742 A1 | 3/2018 | Jia | |
| 2018/0338289 A1 | 11/2018 | Reial | |
| 2019/0158221 A1* | 5/2019 | Sarkis | H04B 7/0473 |

\* cited by examiner

OPPORTUNISTIC RX CHAIN DEPOWERING BASED ON ALLOCATED RANK AND MCS

PRIORITY CLAIM

This application is a continuation of claims priority to U.S. patent application Ser. No. 16/119,801, entitled " Opportunistic RX Chain Depowering Based on Allocated Rank and MCS," filed Aug. 31, 2018, which claims priority to U.S. provisional patent application Ser. No. 62/575,945, entitled " Opportunistic RX Chain Depowering Based on Allocated Rank and MCS," filed Oct. 23, 2017, each of which is hereby incorporated by reference in its entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless devices, and more particularly to systems, methods, and apparatuses for reducing power consumption by opportunistically depowering one or more receiver chains.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others.

Mobile electronic devices may take the form of smart phones or tablets that a user typically carries. Wearable devices (also referred to as accessory devices) are a newer form of mobile electronic device, one example being smart watches. Typically, wearable devices have relatively limited wireless communications capabilities and typically have smaller batteries than larger portable devices, such as smart phones and tablets. In general, it would be desirable to reduce the power requirements of communication devices, including both wearable devices and more traditional wireless devices such as smart phones. Therefore, improvements in the field are desired.

SUMMARY

Embodiments are presented herein of, inter alia, systems, methods, and apparatuses for reducing power requirements of a wireless device by opportunistically depowering one or more receiver chains.

A wireless device may comprise a plurality of receiver chains which may be used for receiving information using one or more wireless technologies. Each of a plurality of receiver chains may comprise one or more of a baseband processor, analog/radio frequency (RF) circuitry, digital circuitry, and an antenna. In some embodiments, the plurality of receiver chains may be configured for multiple-input, multiple-output (MIMO) communication. Each of the plurality of receiver chains may be configured to be separately powered down without affecting operation of the others.

The wireless device may be configured to identify opportunities to depower one or more receiver chains during a communication session. Based on decoded control information (e.g., from a physical downlink control channel (PDCCH)), the device may determine an allocated rank and modulation and coding scheme (MCS) associated with the communication session. The device may compare the allocated rank to a number of currently active receiver chains. If the number of active receiver chains is greater than the allocated rank, the device may search a look-up table (LUT) to determine whether to depower one or more receiver chains. The LUT may contain information used to determine which, if any, one or more receiver chains to depower while maintaining a target achievable spectral efficiency. The device may determine to depower one or more receiver chains based on an entry in the LUT. The device may receive payload data using the receiver chains that remain active, e.g., that are not depowered.

Note that the techniques described herein may be implemented in and/or used with a number of different types of devices, including but not limited to, base stations, access points, cellular phones, portable media players, tablet computers, wearable devices, and various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
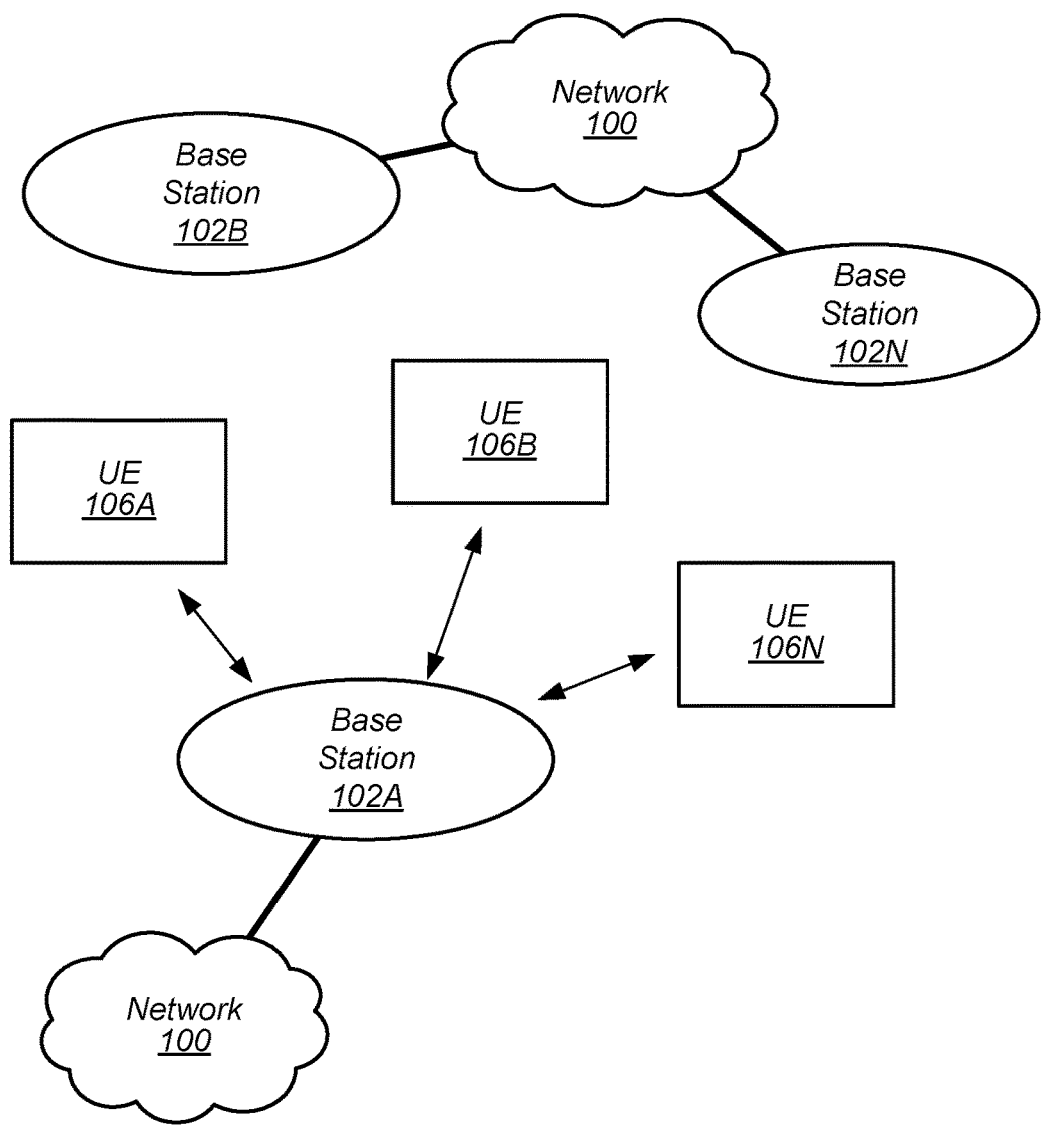
FIG. 1 illustrates an exemplary (and simplified) wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The Following is a Glossary of Terms Used in this Disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, Play Station Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Base Station—The term "Base Station" has the full breadth of its ordinary meaning, and at least includes a wireless communication station installed at a fixed location and used to communicate as part of a wireless telephone system or radio system.

Link Budget Limited—includes the full breadth of its ordinary meaning, and at least includes a characteristic of a wireless device (a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to a hardware limitation of the device, e.g., its size, battery power, and/or transmit/receive power. For example, a smart watch that is communicating over LTE or LTE-A with a base station may be inherently link budget limited due to its reduced transmit/receive power and/or reduced antenna, e.g., relative to those of a smart phone. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
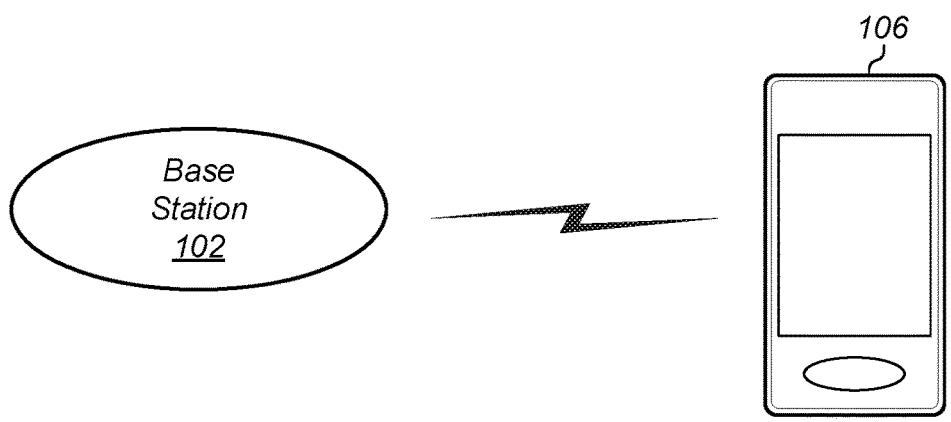
FIG. 2 illustrates a base station (BS) in communication with a user equipment (UE) device, according to some embodiments.

FIGS. 1 and 2—Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), 5G NR, HSPA 3GPP2 CDMA2000 (e.g., 1xRTT, 1xEV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100, according to the same wireless communication technology as base station 102A and/or any of various other possible wireless communication technologies. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 may be configured to communicate using a wireless networking (e.g., Wi-Fi) and/or peer-to-peer wireless communication protocol (e.g., BT, Wi-Fi peer-to-peer, etc.) in addition to at least one cellular communication protocol (e.g., GSM, UMTS (WCDMA, TD-SCDMA), LTE, LTE-A, HSPA, 3GPP2 CDMA2000 (e.g., 1xRTT, 1xEV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In one embodiment, the UE 106 might be configured to communicate using either of CDMA2000 (1xRTT/1xEV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above. Further, in some embodiments, the UE 106 may comprise multiple receiver chains, e.g., for MIMO communication.

In some embodiments, the UE 106 may include separate (and possibly multiple) transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1xRTT (or UMTS or GSM), and separate radios for communicating using each of Wi-Fi and Bluetooth. Other configurations are also possible.

Figure 3:
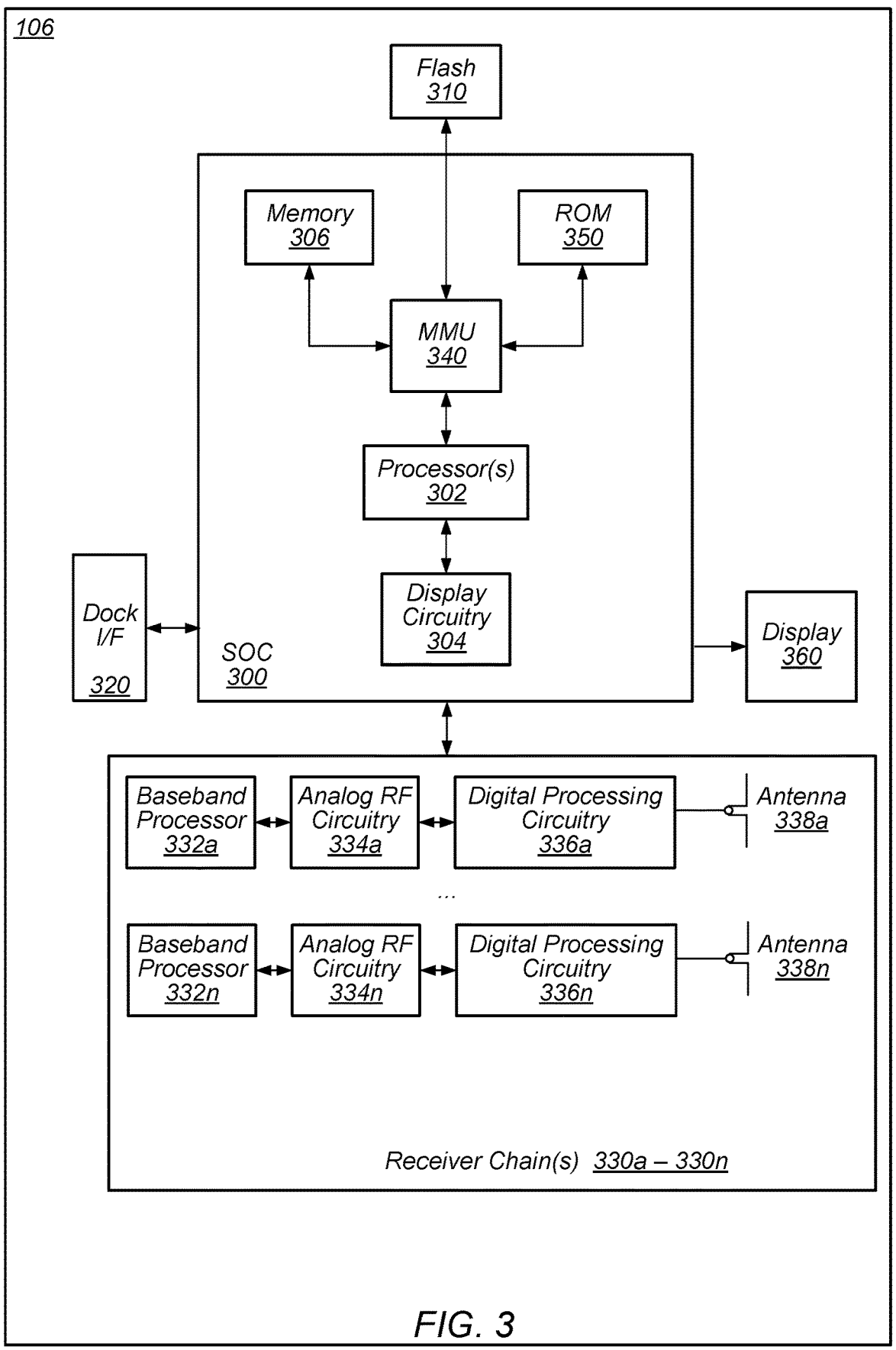
FIG. 3 illustrates an exemplary block diagram of a UE device, according to some embodiments.

FIG. 3—Exemplary Block Diagram of a UE Device

FIG. 3 illustrates one possible block diagram of a UE device, such as UE device 106. As shown, the UE device 106 may include a system on chip (SOC) 300, which may include portions for various purposes. For example, as shown, the SOC 300 may include processor(s) 302 which may execute program instructions, and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, Flash memory 310). The MMU 340 may be configured to perform memory protection and page table translation or set up. In some embodiments, the MMU 340 may be included as a portion of the processor(s) 302.

The UE device 106 may also include other circuits or devices, such as the display circuitry 304, receiver chains 330, dock/connector I/F 320, and/or display 340.

In the embodiment shown, ROM 350 may include a bootloader, which may be executed by the processor(s) 302 during boot up or initialization. As also shown, the SOC 300 may be coupled to various other circuits of the accessory device 107. For example, the UE device 106 may include various types of memory, a connector interface 320 (e.g., for coupling to a computer system), the display 360, and wireless communication circuitry/receiver chain(s) 330 (e.g., for communication using cellular, Wi-Fi, Bluetooth, NFC, GPS, etc.). In some embodiments, one or more of wireless communication circuitry/receiver chain(s) 330 may perform both send and receive functions.

The UE device 106 may include at least one receiver chain 330 (e.g., receiver chain 330a, as illustrated), and in some embodiments multiple receiver chains (e.g., including any number of receiver chains 330b-330n), for performing wireless communication with base stations and/or other devices. UE device 106 may perform communications with base stations and other devices implementing different wireless technologies in some embodiments. In particular, UE device 106 may employ multiple receiver chains 330a-330n for MIMO communications, e.g. using cellular. Each receiver chain 330a-330n may include a baseband processor 332, analog RF signal processing circuitry 334, digital processing circuitry 336, and an antenna 338, among various possibilities. In some embodiments, not all illustrated components of a receiver chain 330a-330n may be included. Individual receiver chains may be separately powered, e.g., so that one subset of receiver chains 330 may be powered or active while another subset may be depowered or inactive. Note that the term depowered as used herein may include a variety of possible states, including low power states, fully depowered states, sleep states, etc. Additionally, the receiver chains may be configured so that individual elements/components of a receiver chain may be separately powered or depowered. For example, in some embodiments it may be possible to more quickly power/depower one element (e.g., baseband processor 332) relative to other components of the receiver chain; e.g., a baseband processor 332 may have a shorter "power-off time" or "cycle time" than the other elements. Thus, under some circumstances, an opportunity may exist to save power by temporarily depowering one or more elements without depowering the remainder of the chain (e.g., because the amount of time to depower and repower the remaining components may exceed the amount of time before those components may be needed). In other words, specific elements may be selected to power off based on a comparison of the power-off time and a transmission time interval (TTI) associated with an active communication session. In some embodiments, a single receiver chain may include multiple antennas.

For example, the UE device 106 may use antenna(s) 338 to perform wireless communication. As noted above, the UE may in some embodiments be configured to communicate wirelessly using a plurality of wireless communication standards or radio access technologies (RATs).

As described herein, receiver chain(s) 330 may include hardware and software components for implementing embodiments of this disclosure. The receiver chain(s) 330 of the UE device 106 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

The receiver chains 330 may also include elements such as Wi-Fi Logic and Bluetooth Logic that are not illustrated. The Wi-Fi Logic may enable the UE device 106 to perform Wi-Fi communications on an 802.11 network. The Bluetooth Logic may enable the UE device 106 to perform Bluetooth communications.

Figure 5:
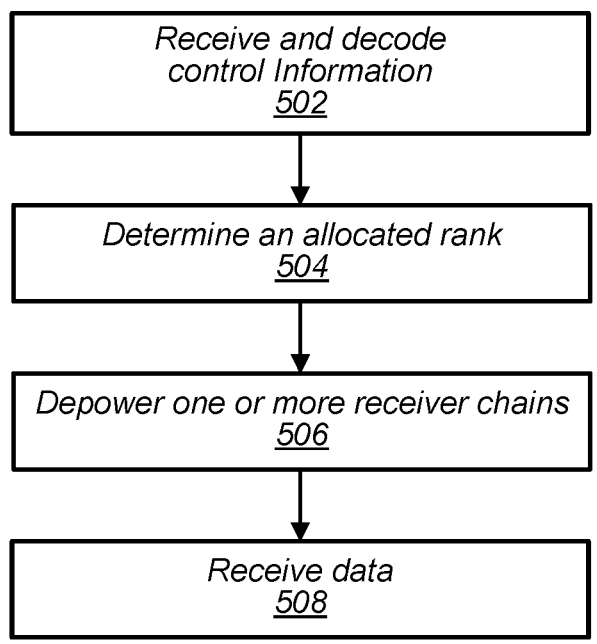
FIG. 5 is a flowchart diagram illustrating an exemplary method for opportunistically depowering receiver chains, according to some embodiments.

As described further subsequently herein, the UE 106 may include hardware and software components for implementing features for opportunistically depowering one or more receiver chains 330, such as those features described herein with reference to, inter alia, FIG. 5. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition)

the processor 302 of the UE device 106, in conjunction with one or more of the other components may be configured to implement part or all of the features described herein, such as the features described herein with reference to, inter alia, FIG. 5.

Figure 4:
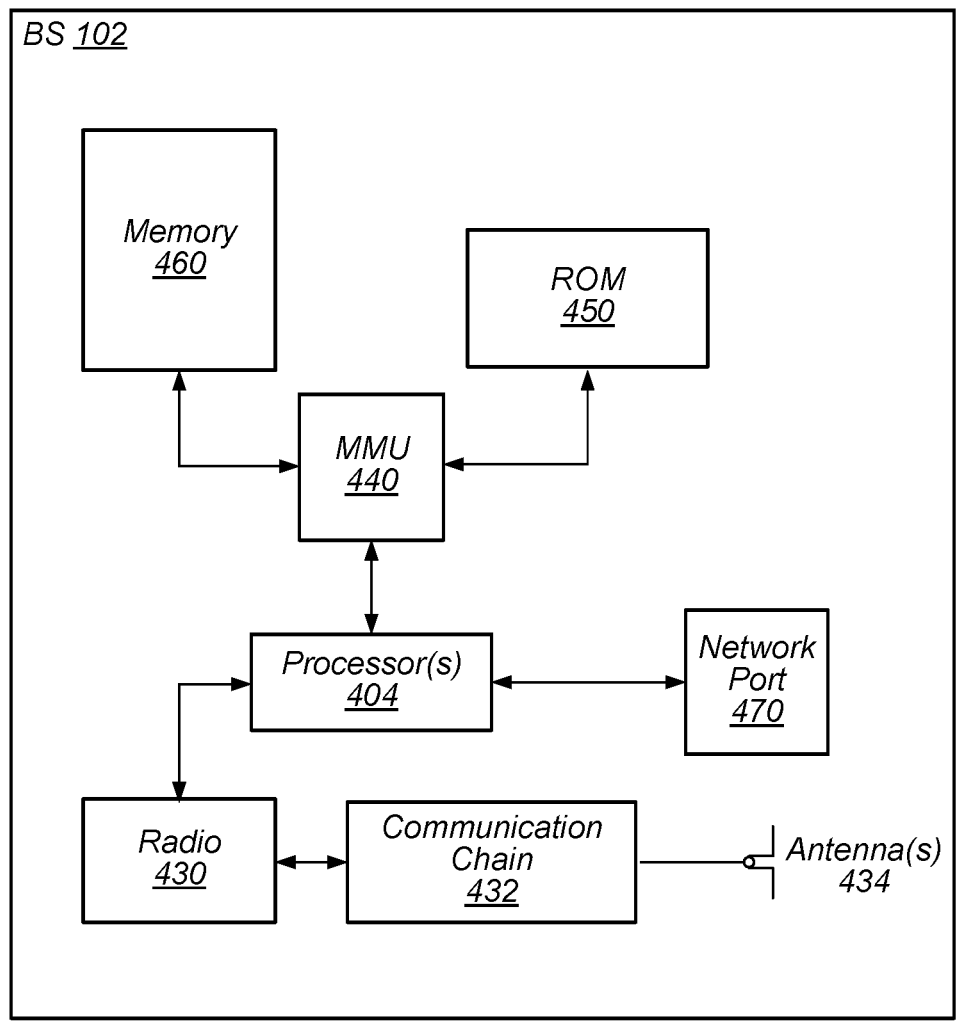
FIG. 4 illustrates an exemplary block diagram of a BS, according to some embodiments.

FIG. 4—Exemplary Block Diagram of a Base Station

FIG. 4 illustrates an exemplary block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, UMTS, CDMA2000, Wi-Fi, etc.

The BS 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi).

The BS 102 may be configured to communicate according to MIMO techniques. For example, the BS 102 may use multiple antennas 434 to communicate with UE 106 using its one or more transmit chains and/or receiver chains 330*a*-330*nnn*. For example, there may be one or more transmit chains and/or receiver chains contained within the communication chain 432. Technical standards may describe a variety of modes for communication between these devices, e.g., LTE standards may describe various transmission modes (TM) which may specify different transmission schemes for physical downlink shared channel (PDSCH) messages. For example, TM1 may utilize only a single antenna, while other (e.g., higher numbered) modes may utilize additional antennas. One or more physical downlink control channel (PDCCH) messages may include control information. The control info may include an allocated rank (e.g., rank indication or RI) and modulation and coding scheme (MCS). The nature of the control information may differ between different transmission modes. For example, according to TM3 and TM4, a pre-coding matrix indicator (PMI), may be included, but according to TM9, PMI may not be included.

The BS 102 may include hardware and software components for implementing or supporting implementation of features described herein. The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement part or all of the features described herein.

Figure 6:
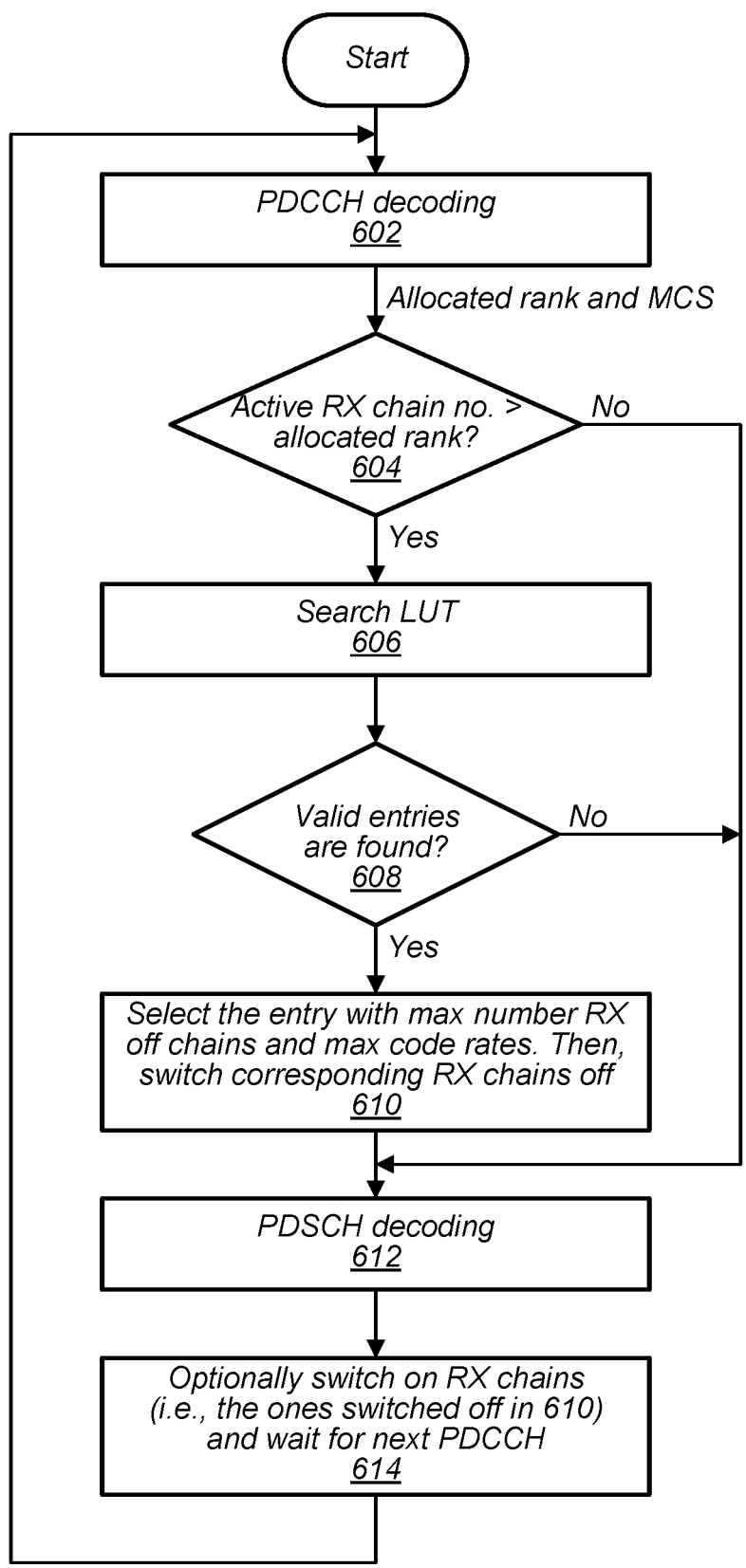
FIG. 6 is a flowchart diagram illustrating an exemplary method for opportunistically depowering receiver chains in LTE, according to some embodiments.

FIGS. 5 and 6—Flowchart Diagrams of Opportunistic Depowering

In some embodiments, a wireless device (e.g., UE 106) may have a limited power supply (e.g., a battery) and extended battery life may be a valuable feature to the user of the device. Powering receiver chains may incur a significant power demand. Accordingly, depowering as many receiver chains as possible, when those chains are unused or underused, may extend the battery life of the device.

According to some technical specifications, e.g., LTE, the number of receiver chains utilized to receive data may vary over time. For example, MIMO-capable UE devices may use up to four receiver chains, among various possibilities. An eNodeB (e.g., BS 102) may use a variety of techniques to transmit data to a UE; these techniques may require different numbers of active (e.g. powered) receiver chains for the UE (e.g., UE 106) to successfully receive and decode the data. Further, in MIMO communications, the BS 102 may indicate an allocated rank to the UE, and the number of receiver chains required may vary with the allocated rank. For example, if the BS allocates rank 1 to a UE in a PDCCH message, the UE may determine that it may be able to receive the data in an upcoming PDSCH message using only one receiver chain. FIG. 5 illustrates a method for using the allocated rank to opportunistically and selectively depower receiver chains, according to some embodiments.

In 502, a UE (e.g., UE 106) may receive and decode control information. The control information may be sent by a BS (e.g., BS 102) or by another device (e.g., another UE, an access point, or various other possibilities). The control information may be included in a physical downlink control channel (PDCCH) message, among other possibilities. The control information may relate to a data transmission from the sending device to the UE.

The control information may be received using any number of receiver chains. For example, the UE may use all of its receiver chains to receive the control information, or the UE may have previously depowered one or more receiver chains and may use only the receiver chains that are not depowered (i.e., it may use the active receiver chains).

The UE may be configured to report information relevant to determining the control information. For example, the UE may periodically send channel quality indicator (CQI) reports to a BS; the BS may use the CQI to select the control information (e.g., past measurements may be used to select current/future control information). The BS may also take measurements or use other information to select the control information.

The control information may include an allocated rank (e.g., a rank indicator or RI). For example, a MIMO-capable UE communicating with a BS may include four receiver chains, e.g., may include four antennas. The BS may also include four or more antennas to enable MIMO communication (e.g., 4×4 MIMO). Thus, the UE may be capable of receiving up to four signals (e.g., layers) from the BS concurrently. Layer to antenna mapping may be applied, e.g., each layer may be mapped to any number of antenna ports (e.g., antennas). Each antenna port may send and/or receive information associated with one or more layers. The rank may comprise multiple bits and may indicate the number of signals that the BS may send to the UE in an upcoming time period (e.g., during an upcoming transmission time interval or TTI). For example, an indication of rank 4 may indicate that the BS will send 4 signals to the UE. In the example of 4×4 MIMO, the RI may be two bits in length (e.g., since two bits are sufficient to distinguish 4 different rank values).

The control information may also include a modulation and coding scheme (MCS). The MCS may be an MCS index and may indicate a modulation order (e.g., number of bits per symbol), a modulation technique, and/or a code rate (e.g., coding rate). For example, the MCS may indicate quadrature phase shift keying (QPSK) with code rate $\frac{2}{3}$, among various possibilities.

The control information may also include a pre-coding matrix indicator (PMI). The PMI may indicate which pre-coding matrix should be used for transmissions to the UE from a codebook. As noted above, PMI may be included in some transmissions modes (e.g., TM3, TM4), but not in others (e.g., TM9).

The control information may also include carrier aggregation (CA) information. The control information may also be sent via a different component carrier (or carriers) than data information. For example, in LTE CA, control information may be sent via a primary component carrier (PCC) only while data information may be sent via both primary and secondary component carriers (SCC), among various possibilities. The control information may indicate rank information for one or more SCCs that may be different than rank information for a PCC. Similarly, the control information may indicate that some or all SCCs may not be used for data transmission.

In 504, the UE may determine an allocated rank. The allocated rank may be determined based on the control information, e.g., based on an RI included in the control information. The UE may decode the RI and, based on the bit(s) of the RI, may determine the allocated rank for an upcoming time period or periods.

In 506, the UE may depower one or more receiver chains. The UE may determine the receiver chains to depower based on the control information. For example, the UE may compare the allocated rank to a number of active receiver chains. In particular, if the number of active receiver chains is greater than the allocated rank, the UE may depower one or more receiver chains.

The UE may consult a lookup table (LUT) to determine how many, and specifically which, receiver chains to depower. Each entry in the LUT may include one or more of a rank, an active receiver chain set (e.g., specifying which receiver chain(s) are active and which receiver chain(s) are inactive for that entry), and an achievable code rate. In various embodiments, not all of the enumerated fields may be included in LUT entries and/or additional fields (e.g., PMI) may be included, as desired. In consulting the LUT, the UE may search for valid entries, according to some embodiments. For example, an entry may be considered valid if it matches the allocated rank, requires fewer active receiver chains than are currently active, and has an achievable code rate that is higher than the code rate of the allocated MCS, among other possibilities.

Thus, in some embodiments, to search for a valid entry in the LUT, the UE may search for entries associated with the allocated rank. This may result in finding entries which have a sufficient number of active receiver chains to receive the upcoming data associated with the allocated rank. Further, this may result in finding entries which do not have more active receiver chains than are required to receive the upcoming data. For example, the UE may leave enough receiver chains active to receive each signal/layer sent by the sending device/BS, without leaving any "extra" or additional receiver chains active.

Further, in some embodiments, to search for a valid entry in the LUT, the UE may search for entries with a smaller number of active receiver chains than are currently active. This may result in finding entries which specify that the UE can depower at least one currently active (e.g., currently powered) receiver chains, and thus may reduce the number of currently active receiver chains by at least one. In some embodiments, an entry may specify depowering individual components of a receiver chain or otherwise partially depowering one or more receiver chains. Further, in some embodiments different receiver chains may require different amounts of power. Thus, in some embodiments, the UE may search for entries with a smaller total power consumption associated with receiver chains relative to the currently active set of receiver chains.

Further, in some embodiments, to search for a valid entry in the LUT, the UE may search for entries with an achievable code rate (e.g., code rate may, at least in part, determine spectral efficiency). that is higher than the code rate of the control information (e.g., of the allocated MCS). In some embodiments, this search may include a configurable margin for the code rate, e.g., search for entries with a code rate higher than the code rate of the allocated MCS by at least a threshold amount. This may result in finding entries which may allow the UE to successfully receive and decode the upcoming data associated with the control information. In other words, employing the radio configuration associated with a valid entry may enable the UE to achieve the code rate that the sender intends to use.

The LUT may be stored in the memory of the UE or may be retrieved from another device. The LUT may be created by the UE or other device in a variety of ways and during a variety of time periods. Creation of the LUT is described in more detail with respect to FIGS. 7 and 8 below.

The UE may select a final candidate entry to implement. A final candidate entry may be a valid entry which requires the fewest active receiver chains, e.g., which allows the UE to depower or power down the largest number of receiver chains, e.g., or otherwise achieve the largest reduction in power use. In the event that two or more valid entries have the same highest number of depowered receiver chains (e.g., if two or more final candidate entries are found) or the same highest reduction in power use, the UE may select the one of the final candidate entries with the highest code rate margin. In other words, if there is a tie for the fewest active receiver chains, code rate margin may be used as a tie breaker to select an entry to implement.

In some embodiments, the UE may depower receiver chains according to the selected entry. The UE may depower one or more currently active receiver chains in order to match the active receiver chain set of the selected entry. In some embodiments, one or more receiver chains may be partly depowered, e.g., may enter a low power state, but may still consume some power. For example, some elements of a receiver chain may be depowered while others may remain powered. Among other possibilities, elements with a longer cycle time may not be depowered (e.g., if the time to depower and then repower an element is greater than the duration of one TTI, then such an element may not be depowered). In some embodiments, one or more receiver chains may be powered on in order to match the selected entry (e.g., chains 1 and 2 may be depowered, and previously depowered chain 3 may be powered on, for a net reduction of 1 currently active receiver chain).

In some embodiments, the UE may depower receiver chains according to CA information included in the control information, e.g., may select receiver chains to depower based on an indication that an SCC associated with a receiver chain may not be used. For example, if the control information indicates that data will not be transmitted on some or all SCCs, receiver chains associated with the unused SCCs may be depowered. In some embodiments, the UE may depower receiver chains for SCCs according to control information sent by PCC. For example, the control information for SCCs may be transmitted on a PCC (e.g. cross carrier scheduling in LTE and 5G). In other words, based on an SCC's rank and modulation and coding scheme (MCS) information from control information transmitted by PCC, some receiver chains for the SCC may be depowered for its associated data transfer.

The timing of depowering the receiver chains may vary. In some embodiments, control information and its associated data information may be transmitted from different time slots (e.g. cross-slot scheduling in 5G standard). In these cases, the execution of depowering receiver chains may not occur immediately after control information decoding (e.g., there may be a delay between 502/504 and 506, among various possibilities). In other words, the execution of depowering receiver chains may have a pipeline latency with respect to the timing when control information is decoded.

In some embodiments, in the event that no valid entry is found, the UE may proceed to 508 without depowering receiver chains.

In 508, the UE may receive data. The UE may use the set of active receiver chains (i.e., the receiver chains that were not depowered) selected in 506 to receive data from the BS or sending device. The data may include payload data and/or further control information, among various possibilities. The data may be received in one or more PDSCH messages, among other possibilities, during one or more TTIs.

In some embodiments, the UE may repower (e.g., power back on) some or all of the depowered receiver chains after receiving the data. In other embodiments, or under other circumstances, the UE may not repower any receiver chains. Technical standards may vary so that, for example, in some standards (e.g., potentially LTE release 15), all chains may be repowered in order to be ready to receive next information while in other standards, a UE may receive subsequent data with the previously depowered receiver chains still depowered. For example, this may the choice if cross carrier scheduling (e.g. in LTE) is used, where control information and data may use different chains. For example, the UE may repower receiver chains if the next information may require additional receiver chains (e.g., for reception of the control information itself). According to some standards, decoding requirements may change frequently, e.g., for each subframe or slot. Additionally, the UE may consider the timing relationship between control information and payload information in relevant technical standards. For example, some standards (e.g., releases of LTE) may include payload data (e.g., typical of PDSCH) in a control channel (e.g., PDCCH) message. Further, the UE may repower components that require additional time to power on, e.g., if such components may be needed to receive upcoming payload data (e.g., a next PDSCH). The UE may then wait for next control information.

Although the description of the methods relating to FIG. 5 focuses on the UE receiving information, it should be appreciated that the UE may also transmit data. Such transmissions may occur simultaneously, before, or, after any of the actions described herein. The UE may use some or all of the same elements (e.g., antennas) for transmission as for reception, or may use different elements. Further, in some embodiments, the UE may modify the selection or use of active receiver chains to perform transmission related functions, as desired.

FIG. 6 provides additional detail of some exemplary embodiments, using LTE as an example. In some embodiments, a wireless device (e.g., UE 106), may decode control information from a PDCCH message in 602. The PDCCH may include an allocated rank and MCS and may further include other information.

In 604, the UE may determine whether the number (no.) of currently active receiver chains (e.g., RX chains) is greater than the allocated rank. If not, e.g., if the number of active receiver chains is less than or equal to the allocated rank, then all of the active receiver chains may be needed to receive an upcoming PDSCH message, and the UE may proceed to 612 without depowering any receiver chains. However, if the number of active receiver chains is greater than the allocated rank, the UE may identify an opportunity to depower one or more receiver chains. For example, if 4 of 4 receiver chains are active, and the UE is allocated rank two, the UE may be able to opportunistically depower up to 2 receiver chains.

In 606, the UE may search a lookup table (LUT) for valid entries. As noted above, a valid entry may match the allocated rank, describe a set of active receiver chains that is at least one chain fewer than the set of currently active chains, and provide for an achievable code rate at least as high as the code rate of the allocated MCS. If no valid entries are found in 608, the UE may proceed to 612 without depowering any receiver chains. However, if at least one valid entry is found, the UE may proceed, in 610, to select one of the valid entries for implementation. One of the valid entries may be selected based on having 1) the maximum number of powered-off receiver chains (e.g., or minimum power required to operate an active receiver chain set) and 2) the highest achievable code rate. In some embodiments, these selection criteria may be prioritized (e.g., number of powered chains may be prioritized more than code rate). However, the criteria may be prioritized differently and/or other criteria may be considered, as desired. The UE may switch off (e.g., depower) receiver chains in order to match the set of active receiver chains associated with the selected valid LUT entry.

In 612, the UE may receive and decode data from the sending device/BS. The data may be in a PDSCH message or multiple messages. After decoding the data, the UE may, in 614, optionally power on some or all of the receiver chains depowered in 610 and may await further control information, e.g., in a next PDCCH. Thus, the method may iterate indefinitely; in other words, as control and payload information are received, the set of active receiver chains may change according to the methods described herein.

Figure 7:
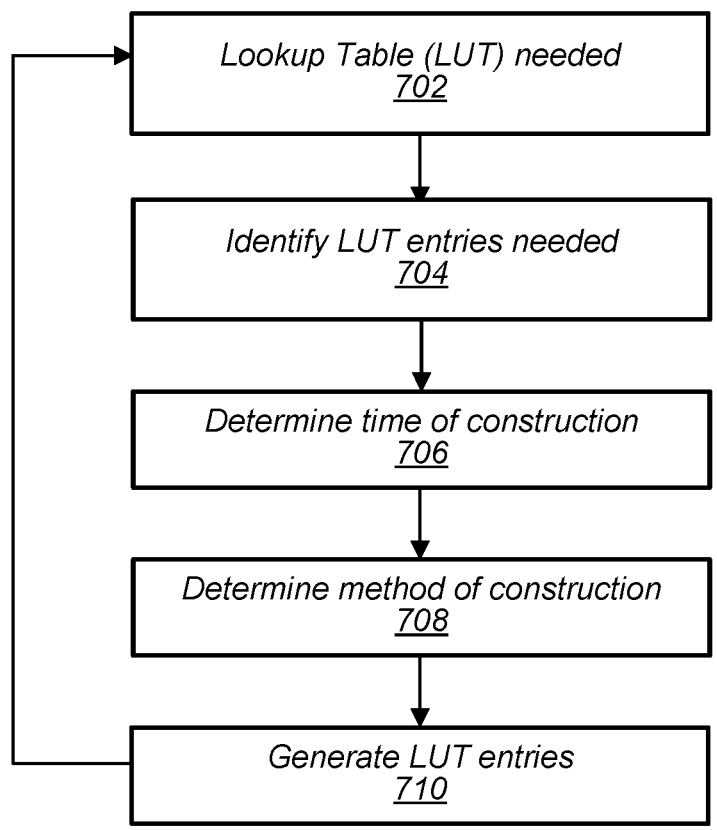
FIGS. 7 and 8 are flowchart diagrams illustrating exemplary methods of creating look up tables, according to some embodiments.
Figure 8:
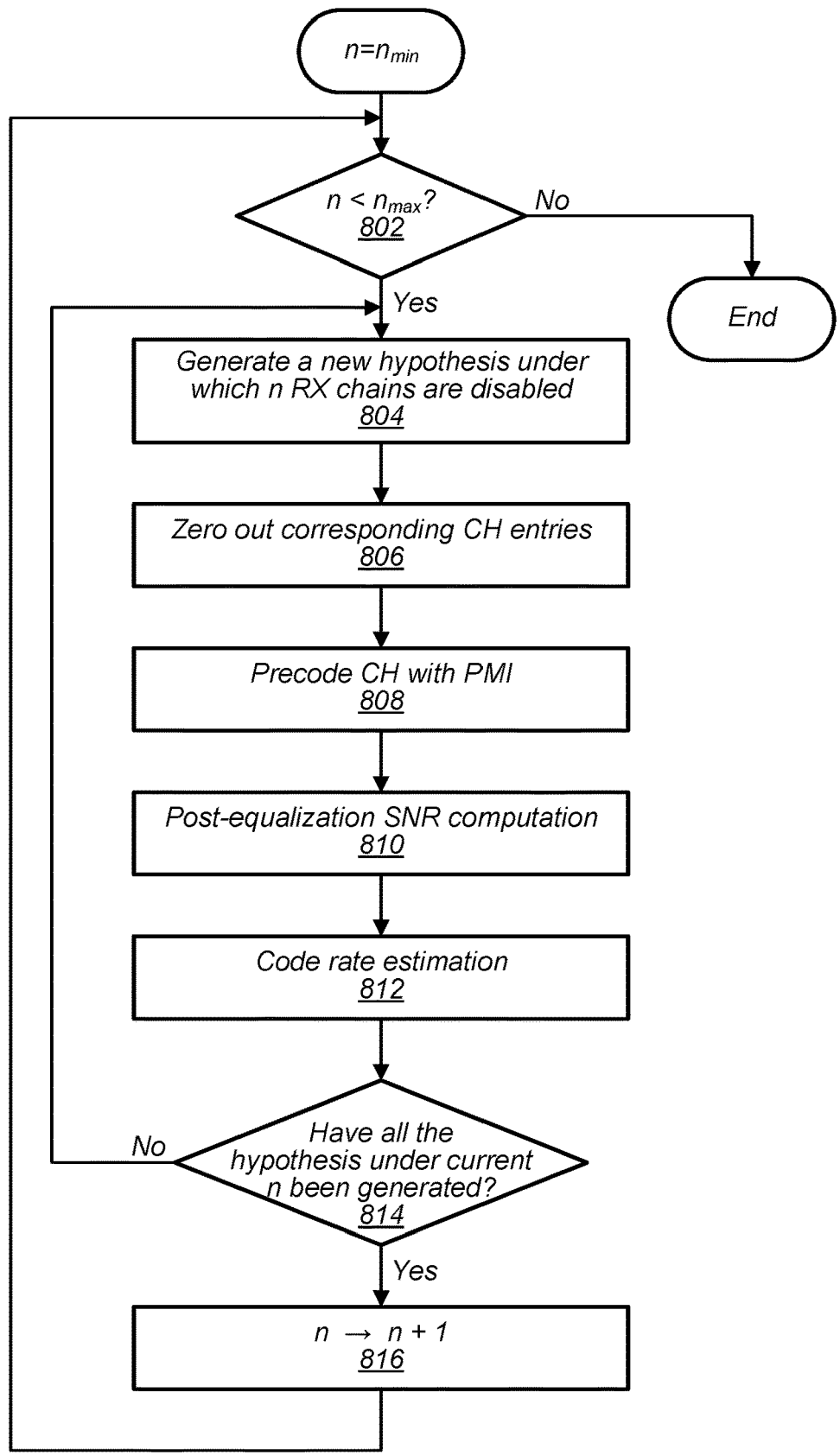

FIGS. 7 and 8—Flowchart Diagrams of Lookup Table (LUT) Construction

In some embodiments, a wireless device (e.g., UE 106) may require a LUT to identify opportunities to depower one or more receiver chains and to select which receiver chain(s) to depower. FIG. 7 illustrates a potential method for creating such a LUT, according to some embodiments. As noted previously, the LUT may be generated and stored by the UE, or may be retrieved from another device (e.g., from a BS), as desired.

In 702, the UE may determine that a LUT is needed, e.g., in anticipation of upcoming control information, or for responding to current control information. For example, the UE may determine that a LUT is needed if an active number of receiver chains is larger than an allocated rank determined from received control information, as variously described above in reference to FIGS. 5 and 6. In some embodiments, this determination may occur regularly, e.g., associated with each PDSCH or other message containing control information. In some embodiments, creating (e.g., re-creating) the LUT regularly may allow the LUT to reflect current conditions, such as channel quality. For example, a LUT may be used for a single TTI, and a new LUT may be created for each successive TTI. In some embodiments, a LUT may be used (e.g., re-used) for any number of TTIs.

In 704, the UE may determine which LUT entries are needed. An entry may be needed for all possible active receiver sets (e.g., combinations of receiver chains, each such combination may be referred to as a hypothesis) that have at least one active receiver and at least one more receiver chain depowered than are currently depowered (e.g., if any). For example, a UE with 4 active receiver chains may determine that LUT entries are needed for all possible active receiver chain sets with 1, 2, or 3 active receive chains. Further, in some embodiments, LUT entries may differentiate between different receiver chains. For example, a set with receiver chains x and y active may be described in a different entry than a set with chains x and z active, even though both sets include two active receiver chains. In some embodiments, the number of LUT entries needed may be reduced based on available control information. For example, if an allocated rank is known, entries with fewer receiver chains active than the numerical value of the rank may be skipped (e.g., may not be generated). Further, the UE may keep (e.g., may reuse) one or more LUT entries from a previous LUT.

In 706, the UE may determine when to construct or build up the LUT (e.g., when to generate the entries of the LUT). As described in further detail below, possible times for LUT construction may include: prior to receiving control information (e.g., off-line), while receiving control information (e.g., on-line), or a combination of both.

Constructing the LUT prior to receiving control information (e.g., off-line) may occur at any time prior to receiving control information. In other words, LUT creation may be completed during a TTI prior to the TTI for which the LUT may be used. In some embodiments, LUT creation can be incorporated into other processes such as channel state information (CSI) feedback computation or channel measurement procedures. Off-line construction may require less computation than an on-line construction approach. Further, the magnitude of the computation requirement benefit of off-line construction may depend on what information is available to the UE. For example, if the UE does not have access to PMI information (e.g., in TM9), then the computational benefit of the off-line approach may be larger than in circumstances wherein the PMI is available.

Constructing the LUT while receiving the control information (e.g., note that the construction process of the LUT may continue after the control information is received) may result in using the latest channel conditions to construct the LUT, and thus may result in more accurate LUT entries. Accordingly, on-line LUT construction may be most beneficial in circumstances of a fast-fading channel or rapidly changing channel conditions.

In some embodiments, off-line and on-line construction may be combined. Some or all LUT entries may be generated prior to receiving control information, e.g., off-line. Further, some additional LUT entries may be generated and/or existing LUT entries may be updated, while receiving the control information (e.g., on-line). For example, off-line computation may be viewed as an initialization procedure, while on-line computation may be viewed as a tracking procedure. In some embodiments, a time averaging (e.g., filtering) approach may be used. For example, LUT entries may be generated in a first TTI, channel conditions may be monitored, and then if a rolling average of the channel conditions varies sufficiently, one or more LUT entries may be updated in a second TTI, for use during a second TTI. Further, this approach may be applied over any number of TTIs, on an iterative basis.

In 708, the UE may determine a method of generating LUT entries. The methods described herein may be applied with any of the time periods of construction described above, as desired.

In some embodiments, the LUT may be built-up using coarse information (e.g., coarse methods). For example, the LUT entries may be estimated using channel signal to noise ratio (SNR), channel signal to interference and noise ratio (SINR), channel estimation, antenna correlation estimation, or eigenvalues of a channel matrix (e.g., of a noise-whitened channel matrix). One or more of these values may be used to estimate an achievable code rate for the combination of active receiver chains in each entry. For example, a combination of estimated channel SNR and antenna correlation may be used.

The LUT may be built-up using channel capability (e.g., mutual) information (e.g., accurate methods). Mutual information may refer to the capability of the channel to transmit information (e.g., the bit rate) based on the bandwidth of the channel and modulation. PMI may also be used. Thus, each LUT entry may be generated by calculating an achievable code rate given the active set of receiver chains, modulation, and/or PMI.

In some embodiments, a combination of the methods may be used. For example, some LUT entries may be generated using coarse information, and others may be generated using channel capability.

In 710, the UE may generate entries of the LUT at the time(s) determined in 706 and in the manner determined in 708. The times and methods may be combined in numerous possible ways. For example, coarse information may be used for off-line generation of some entries and then channel capability may be used to update some entries on-line, or vice versa.

The UE may consider additional information, parameters, or targets to generate LUT entries, as desired. For example, the UE may consider one or more target values of various metrics related to successful reception and decoding of received information. Such a target may be designed, or may be calibrated, to achieve a high throughput (e.g., to exceed a threshold throughput, achieve a throughput within a target range, or to approach an optimal throughput), among other possibilities. One type of exemplary target may be to achieve a target block error rate (BLER). For example, in some embodiments, a target BLER of 10% may be used.

FIG. 8 illustrates exemplary embodiments of LUT construction. In the exemplary embodiment, channel capability may be used to generate LUT entries during on-line LUT creation when the PMI is available (e.g., in TM3 or TM4 in LTE). In the illustrated embodiment, the method may iterate in a loop using the number, n, of depowered receiver chains. Initially, n may correspond to $n_{min}$, the minimum number of receiver chains to depower (e.g., n may be set to 0 or to 1) and may iterate up to $n_{max}$, the maximum number of chains to depower (e.g., after a number of iterations equal to $n_{max}-n_{min}$). Prior to initiating the illustrated loop, the UE may determine the allocated rank, PMI, and MCS.

In 802, the UE may determine whether n is less than $n_{max}$. If not, the process may end, e.g., because the LUT is complete. If n is less than $n_{max}$, in 804, the UE may generate a new hypothesis (e.g., initial LUT entry). The new hypothesis may include n depowered receiver chains. For example, if the UE includes 4 receiver chains and if n=2, the new hypothesis may include 2 depowered receiver chains and 2 powered receiver chains. The hypothesis may further specify which receiver chains are depowered. For example, the individual and/or collective performance of the receiver chains may vary depending not only on how many receiver chains are active, but additionally on which receiver chains are active. For example, the absolute locations of the receiver chains within the UE, as well as their relative locations with respect to each other, may cause different combinations of a given number of active receiver chains to operate with different specifications. Additionally, different receiver chains may be configured with different individual specifications, such that the radio performance of the UE may vary depending on which receiver chains are active. The new hypothesis may further include a noise-whitened channel estimate (e.g., CH). In 806, the entries within CH corresponding to the depowered receiver chains may be set to zero.

In 808, the UE may precode the entries in CH associated with the powered receiver chains with the allocated PMI. In 810, the UE may estimate a signal-to-noise ratio (SNR) for CH. Other or additional metrics of channel quality may be estimated. In 812, the UE may estimate an achievable code rate using the precoded channel estimate, SNR (and/or other metrics), modulation order, and allocated rank. The estimated achievable code rate may be recorded to the entry (e.g., along with the set of active receiver chains and rank).

In 814, the UE may determine whether all hypotheses for the current value of n have been generated (e.g., searched). If not, the UE may return to 804 to generate a next hypothesis. If all hypothesis for the current n have been created, then the UE may, in 816, iterate n to the next value (e.g., greater by 1), and then may continue at 802 with the new value.

In the Following, Exemplary Embodiments are Provided.

In one set of embodiments, a method for a wireless user equipment (UE) device, may comprise: establishing a wireless communication link; receiving control information associated with the wireless communication link using a plurality of receiver chains; constructing a look up table (LUT), wherein each of the entries in the LUT comprises: an active receiver chain set, and an achievable code rate; based on the control information, depower a first subset of the plurality of receiver chains, wherein the first subset of the plurality of receiver chains may be selected based on the LUT; and receive additional information using a second subset of the plurality of receiver chains, wherein the second subset of the plurality of receiver chains are not depowered.

In some embodiments, constructing the LUT comprises: determining a pre-coding matrix indicator (PMI), wherein the PMI may be based on the control information; determining each possible active receiver chain set, wherein a possible active receiver chain set comprises: at least one depowered receiver chain, and at least one powered receiver chain, wherein each receiver chain of the plurality of receiver chains may be either depowered or powered; generating at least one entry for each respective active receiver chain set, wherein generating an entry comprises: performing a noise whitened channel estimate based on the respective active receiver chain set; precoding the channel estimate with the PMI; estimating an achievable code rate, based on precoding the channel estimate with the PMI; recording the achievable code rate and the respective required active receiver chain set as an entry.

In some embodiments, at least a first subset of entries in the LUT are generated prior to receiving the control information, at least a second subset of entries in the LUT are generated after receiving the control information, and at least a portion of the first subset of entries in the LUT are regenerated after receiving the control information.

In some embodiments, selecting the first subset of the plurality of receiver chains based on the LUT comprises: determining a subset of entries with the smallest number of receiver chains in the active receiver chain set; if the subset of entries with the smallest number of receiver chains in the active receiver chain set contains only one entry, then selecting that entry; else, selecting an entry from the subset of entries with the smallest number of receiver chains in the active receiver chain set with the highest achievable code rate, e.g., given a certain modulation scheme.

In some embodiments, the method may further comprise: receiving second control information for the wireless communication link using the second subset of the plurality of receiver chains; based on the second control information, modifying the second subset of the plurality of receiver chains to create a modified second subset of the plurality of receiver chains, wherein said modification comprises at least one of: powering on at least one of the first subset of the plurality of receiver chains, and depowering at least one of the second subset of the plurality of receiver chains; and receiving further additional information using the modified second subset of the plurality of receiver chains.

In some embodiments, the control information comprises an allocated rank.

In some embodiments, a user equipment (UE) device configured for multiple-input multiple-output (MIMO) wireless communications may comprise: a plurality of receiver chains configured to receive MIMO communications; a non-transitory computer-readable memory medium; and a processing element coupled to the plurality of receiver chains and the memory medium, wherein the processing element, the memory medium, and the plurality of receiver chains are configured to: receive and decode a physical downlink control channel (PDCCH) message; determine an allocated rank from the decoded PDCCH message; search a lookup table (LUT) for one or more valid entries based on the allocated rank, wherein each entry in the LUT specifies one or more of the plurality of receiver chains to power off, an achievable code rate, and a rank value; power off one or more of the plurality of receiver chains based on the allocated rank and the LUT; and receive a physical downlink shared channel (PDSCH) message using one or more of the plurality of receiver chains that are not powered off.

In some embodiments, the processing element may be further configured to: after receiving the PDSCH message, power on at least one of the one or more powered-off receiver chains.

In some embodiments, in powering off one or more receiver chains based on the allocated rank and the LUT, the processing element may be configured to: compare the allocated rank to a number of active receiver chains; and power off one or more of the plurality of receiver chains based on a determination that the allocated rank may be smaller than the number of currently active receiver chains.

In some embodiments, the processing element may be further configured to: determine a modulation and coding scheme (MCS), and wherein in searching the LUT for one or more valid entries, the processing element may be further configured to search based on the MCS.

In some embodiments, in searching the LUT for one or more valid entries, the processing element may be configured to: for a plurality of entries of the LUT: a) determine that the specified number of receiver chains to power off does not reduce the number of active receiver chains below the allocated rank; b) determine that the achievable code rate is greater than a code rate of the allocated MCS by at least a first threshold; and c) determine that the rank value is equal to the allocated rank; and wherein an entry is considered a valid entry if each of a), b), and c) are determined.

In some embodiments, the processing element may be further configured to select a valid entry that: includes a highest number of receiver chains to power off, wherein if multiple valid entries include the highest number of receiver chains to power off, select the one of the multiple valid entries with the highest achievable code rate.

In some embodiments, to construct the LUT, the processing element may be further configured to: determine a pre-coding matrix indicator (PMI) from the decoded PDCCH message; create a plurality of entries corresponding to different combinations of active and powered-off receiver chains, wherein creating each entry comprises determining an achievable code rate based on the PMI, the allocated rank, and a channel estimate, wherein the channel estimate is based on the combination of active and powered-off receiver chains.

In some embodiments, the channel estimate may be a noise/interference whitened channel estimate.

In some embodiments, to construct the LUT, the processing element may be further configured to create a plurality of entries based on one or more of: signal-to-noise ratio (SNR), channel estimation, antenna correlation estimation, or eigenvalues of a channel matrix.

In some embodiments, the processing element may be further configured to construct the LUT either: while receiving and decoding the PDCCH, or prior to receiving and decoding the PDCCH.

In some embodiments, the processing element may be further configured to construct the LUT by: prior to receiving and decoding the PDCCH, generate a first set of entries, and while receiving and decoding the PDCCH, perform at least one of:
generate a second set of entries, or update at least a subset of the first set of entries.

In some embodiments, the processing element may be configured to construct the LUT based at least in part on a target block error rate.

In some embodiments, each of the plurality of receiver chains may comprise one or more of: a baseband processor, analog radio frequency (RF) signal processing circuitry, digital RF signal processing circuitry, and an antenna.

In some embodiments, powering off a receiver chain may comprise selecting one or more of the baseband processor, the analog RF signal processing circuitry, the digital RF signal processing circuitry, and the antenna to power off, wherein the baseband processor, the analog RF signal processing circuitry, the digital RF signal processing circuitry, and the antenna are selected to power off based on a comparison of their respective power-off times to a transmission time interval (TTI) length associated with the MIMO communications.

In some embodiments, an apparatus, may comprise a processing element and a non-transitory memory medium configured to cause a wireless device to: receive and decode a control message, determine a rank based on the control message, determine a modulation and coding scheme (MCS) based on the control message, determine a target achievable code rate, wherein the target achievable code rate exceeds a code rate associated with the MCS, determine a number of active receiver chains, determine that the number of active receiver chains is greater than the rank, select at least one active receiver chain to power off based on the target achievable code rate, power off the at least one active receiver chain, and receive data.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising a processor configured to cause a wireless user equipment device (UE) to:
   establish a wireless link with a base station;
   receive, via the wireless link, control information from the base station using at least a first receiver chain of a plurality of receiver chains of the UE;
   determine an allocated rank based on the control information, wherein the allocated rank is associated with a first transmission time interval;
   determine, based at least in part on the allocated rank, that the first receiver chain may be depowered;
   depower the first receiver chain, wherein to depower the first receiver chain includes:
      depowering a first element of the first receiver chain with a cycle time shorter than a duration of the first transmission time interval; and
      continuing to power a second element of the first receiver chain with a cycle time longer than the duration of the first transmission time interval; and
   receiving, via the wireless link and during the first transmission time interval, further information from the base station using at least a second receiver chain of the plurality of receiver chains of the UE different from the first receiver chain.

2. The apparatus of claim 1, wherein the first element of the first receiver chain comprises one of:
   a baseband processor;
   analog radio frequency (RF) signal processing circuitry, digital RF signal processing circuitry, and
   an antenna.

3. The apparatus of claim 1, wherein the processor is further configured to cause the UE to:
   repower the first element of the first receiver chain; and
   receive, during a subsequent transmission time interval, additional information using the first receiver chain.

4. The apparatus of claim 3, wherein said repowering the first element of the first receiver chain occurs prior to receiving second control information associated with the subsequent transmission time interval.

5. The apparatus of claim 1, wherein the determination that the first receiver chain may be depowered is further based on a lookup table (LUT).

6. The apparatus of claim 5, wherein each entry in the LUT specifies one or more of:
   a subset of the plurality of receiver chains to depower;
   an achievable code rate; or
   a rank value.

7. The apparatus of claim 5, wherein the processor is further configured to cause the UE to:
   determine a modulation and coding scheme (MCS), based on the control information; and
   search the LUT based on the MCS.

8. A user equipment device (UE) configured for multiple-input multiple-output (MIMO) wireless communications, comprising:
   a plurality of receiver chains configured to receive MIMO communications;
   a non-transitory computer-readable memory medium; and
   a processor coupled to the plurality of receiver chains and the memory medium, wherein the processor, the memory medium, and the plurality of receiver chains are configured to:
   receive a control message;
   decode the control message;
   determine a number of MIMO layers based on the control message;
   determine a number of active receiver chains of the plurality of receiver chains;
   determine that the number of active receiver chains is greater than the number of MIMO layers;
   select at least one active receiver chain to power off in response to the determination that the number of active receiver chains is greater than the number of MIMO layers;
   power off the at least one active receiver chain based on the selection, wherein a first subset of the active receiver chains is not powered off; and
   receive data using the first subset of the active receiver chains.

9. The UE of claim 8, wherein the processor, the memory medium, and the plurality of receiver chains are further configured to:
   determine a modulation and coding scheme (MCS) based on the control message; and
   determine a target achievable code rate, wherein the at least one active receiver chain to power off is selected based on the target achievable code rate.

10. The UE of claim 9, wherein the target achievable code rate exceeds a code rate associated with the MCS.

11. The UE of claim 8, wherein the at least one active receiver chain to power off is selected based on a lookup table (LUT).

12. The UE of claim 8, wherein the at least one active receiver chain to power off is selected based on carrier aggregation information.

13. The UE of claim 12, wherein the carrier aggregation information is included in the control message.

14. The UE of claim 8, wherein powering of the at least one active receiver chain includes powering off a first component of the at least one active receiver chain, wherein a second component of the at least one active receiver chain remains powered on.

15. The UE of claim 14, wherein the first component and second component are selected based on their respective cycle times.

16. A method for operating a user equipment device (UE), the method comprising: by the UE:
   receiving, using a first set of receiver chains, control information from a base station;
   determining, based on the control information, a number of multiple-input multiple-output (MIMO) layers associated with a first time interval;
   selecting, based on the number of MIMO layers, a second set of receiver chains distinct from the first set of receiver chains for the first time interval;
   adjusting active receiver chains of the UE so that each receiver chain of the second set of receiver chains is active and any receiver chain of the first set of receiver chains that is not included in the second set of receiver chains is inactive; and
   receiving, during the first time interval, downlink data using the second set of receiver chains.

17. The method of claim 16, wherein said adjusting active receiver chains includes deactivating at least one receiver chain, wherein the method further comprises reactivating the at least one receiver chain for a second time interval.

18. The method of claim 17, wherein the first time interval is associated with a physical downlink shared channel, wherein the second time interval is associated with a physical downlink control channel.

19. The method of claim 16, wherein said selecting is based on a lookup table (LUT).

20. The method of claim 19, the method further comprising generating at least one entry in the LUT.

\* \* \* \* \*